US012424090B2

(12) United States Patent
Gordon et al.

(10) Patent No.: US 12,424,090 B2
(45) Date of Patent: Sep. 23, 2025

(54) IDENTIFYING AND QUANTIFYING CONGESTION WITHIN A TRAFFIC STREAM

(71) Applicant: GM Global Technology Operations LLC, Detroit, MI (US)

(72) Inventors: Richard Gordon, Canton, MI (US); Donald K. Grimm, Utica, MI (US); Fan Bai, Ann Arbor, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 377 days.

(21) Appl. No.: 18/179,681

(22) Filed: Mar. 7, 2023

(65) Prior Publication Data

US 2024/0304083 A1 Sep. 12, 2024

(51) Int. Cl.
*G08G 1/01* (2006.01)
*G08G 1/0967* (2006.01)

(52) U.S. Cl.
CPC ......... *G08G 1/0145* (2013.01); *G08G 1/0133* (2013.01); *G08G 1/096725* (2013.01); *G08G 1/096733* (2013.01)

(58) Field of Classification Search
CPC ............... G08G 1/0145; G08G 1/0133; G08G 1/096725; G08G 1/096733
USPC .......................................................... 701/117
See application file for complete search history.

(56) References Cited

U.S. PATENT DOCUMENTS 6,810,321 B1 * 10/2004 Cook .................. G08G 1/0104 340/936
7,286,296 B2 10/2007 Chaves et al.
9,965,950 B2 * 5/2018 Xu ...................... G08G 1/0112
11,862,013 B2 * 1/2024 Grimm ................ G08G 1/0133
12,198,546 B1 * 1/2025 Cheng .............. G08G 1/096716
2005/0065711 A1 * 3/2005 Dahlgren ......... G08G 1/096775 701/117
2005/0086032 A1 4/2005 Benitez et al.
2007/0208492 A1 * 9/2007 Downs ................ G08G 1/0129 701/117
2007/0208494 A1 * 9/2007 Chapman ............ G08G 1/0104 701/117

(Continued)

FOREIGN PATENT DOCUMENTS

DE 102017130623 A1 6/2018
DE 102017004859 B4 3/2019

(Continued)

*Primary Examiner* — Luis A Martinez Borrero
(74) *Attorney, Agent, or Firm* — Vivacqua Crane, PLLC

(57) ABSTRACT

A system and method of identifying and quantifying congestion within a traffic stream including obtaining telemetric data from a plurality of vehicles traveling within a plurality of normalized road segments, determining a property of each normalized road segment based on the telemetric data and a road profile for each road segment, determining a disruption score indicative of a level of disruption in a traffic flow within each road segment, mapping the road segments within a two-dimensional spatial-temporal grid of cells, wherein each cell represents a normalized road segment at a specified time, for each cell, determining if the traffic flow is congested, identifying a congested traffic stream including a plurality of contiguous cells that have congested traffic flow, quantifying the congested traffic stream, and providing an output signal.

20 Claims, 10 Drawing Sheets

(56) References Cited

U.S. PATENT DOCUMENTS

| | | | | |
|---|---|---|---|---|
| 2010/0253918 | A1 | 10/2010 | Seder et al. | |
| 2010/0274473 | A1 | 10/2010 | Konishi | |
| 2012/0150425 | A1* | 6/2012 | Chapman | G08G 1/0129 701/119 |
| 2015/0262477 | A1* | 9/2015 | Fowe | G08G 1/096716 701/118 |
| 2015/0321606 | A1 | 11/2015 | Vartanian et al. | |
| 2016/0071411 | A1* | 3/2016 | Stenneth | G08G 1/0129 701/118 |
| 2016/0104377 | A1* | 4/2016 | French | G08G 1/091 701/117 |
| 2016/0111002 | A1 | 4/2016 | Moise et al. | |
| 2017/0184409 | A1* | 6/2017 | Glasgow | G08G 1/0112 |
| 2017/0212633 | A1 | 7/2017 | You et al. | |
| 2017/0352262 | A1* | 12/2017 | Xu | G08G 1/0133 |
| 2019/0272749 | A1 | 9/2019 | Saito et al. | |
| 2020/0090503 | A1* | 3/2020 | Rolf | G08G 1/0116 |
| 2020/0238999 | A1* | 7/2020 | Batts | B60W 30/09 |
| 2020/0242935 | A1 | 7/2020 | Nagata et al. | |
| 2020/0254877 | A1 | 8/2020 | Nakajima et al. | |
| 2021/0191132 | A1 | 6/2021 | Karner et al. | |
| 2021/0360211 | A1 | 11/2021 | Kawamura | |
| 2021/0375128 | A1* | 12/2021 | Hahn | G08G 1/042 |
| 2022/0092970 | A1* | 3/2022 | Radakovic | G08G 1/096741 |
| 2022/0148416 | A1* | 5/2022 | Eldessouki | G08G 1/0133 |
| 2022/0317443 | A1 | 10/2022 | Matsui et al. | |
| 2022/0366782 | A1* | 11/2022 | Grimm | G08G 1/0112 |
| 2023/0067464 | A1* | 3/2023 | Jonietz | G08G 1/0112 |
| 2023/0085192 | A1* | 3/2023 | Young | G08G 1/017 701/117 |
| 2023/0135641 | A1 | 5/2023 | Miyake et al. | |
| 2023/0206753 | A1* | 6/2023 | Xu | G08G 1/052 701/119 |
| 2023/0294634 | A1 | 9/2023 | Tam et al. | |
| 2025/0061802 | A1* | 2/2025 | Zhang | H04W 4/44 |

FOREIGN PATENT DOCUMENTS

| | | | |
|---|---|---|---|
| DE | 102020124666 | A1 | 3/2021 |
| DE | 102021117850 | A1 | 1/2022 |
| WO | 2013088510 | A1 | 6/2013 |

* cited by examiner

900

902 908 906 910

| | | | | Road Performance | | | | | | Key Performance Indicators | | | | | | KRI | Disput | AM | |
|---|---|---|---|---|---|---|---|---|---|---|---|---|---|---|---|---|---|---|---|
| dtlocdd | seg | hh | mm | veh | vObs | vAvg | vStd | vMin | vMax | refM | z_veh | z_vObs | z_vCV | _netHbraV | refM | Profile | Score | Rush | Event |
| 9/18/2019 | 1 | 7 | 4 | 26 | 68 | 121.70 | 7.26 | 104.82 | 134.79 | -4 | -0.42 | 0.41 | 0.61 | -0.01 | 4 | | 0 | TRUE | |
| 9/18/2019 | 2 | 7 | 4 | 29 | 137 | 121.34 | 8.19 | 99.07 | 138.23 | -4 | -0.64 | -0.57 | 0.44 | 0.63 | 4 | | 0 | TRUE | |
| 9/18/2019 | 3 | 7 | 4 | 33 | 170 | 118.51 | 12.77 | 82.94 | 139.38 | -4 | -0.94 | -1.05 | -0.04 | -0.15 | 4 | | 0 | TRUE | |
| 9/18/2019 | 4 | 7 | 4 | 33 | 192 | 110.27 | 26.78 | 1.14 | 135.94 | -4 | -0.94 | -1.36 | -2.49 | -2.25 | 4 | | 96 | TRUE | |
| 9/18/2019 | 5 | 7 | 4 | 31 | 168 | 99.58 | 42.83 | -0.01 | 137.08 | -4 | -0.79 | -1.02 | -2.52 | -1.66 | 4 | | 90 | TRUE | |
| 9/18/2019 | 6 | 7 | 4 | 26 | 130 | 122.42 | 7.55 | 103.68 | 145.14 | -4 | -0.42 | -0.47 | 0.58 | 0.08 | 4 | | 0 | TRUE | |
| 9/18/2019 | 7 | 7 | 4 | 25 | 95 | 122.60 | 8.18 | 102.52 | 152.07 | -4 | -0.34 | 0.03 | 0.54 | -0.13 | 4 | | 0 | TRUE | |
| 9/19/2019 | 1 | 7 | 4 | 20 | 56 | 120.11 | 8.92 | 99.07 | 141.70 | -4 | 0.03 | 0.59 | 0.44 | 0.28 | 4 | | 0 | TRUE | |
| 9/19/2019 | 2 | 7 | 4 | 33 | 120 | 118.64 | 7.93 | 95.23 | 141.69 | -4 | -0.94 | -0.33 | 0.32 | -0.18 | 4 | | 0 | TRUE | |
| 9/19/2019 | 3 | 7 | 4 | 39 | 213 | 113.15 | 11.86 | 63.36 | 140.53 | -4 | -1.39 | -1.66 | -0.63 | -0.74 | 4 | | 68 | TRUE | |
| 9/19/2019 | 4 | 7 | 4 | 40 | 255 | 103.77 | 25.18 | 2.31 | 137.08 | -4 | -1.47 | -2.27 | -2.45 | -3.88 | 4 | | 100 | TRUE | Crash |
| 9/19/2019 | 5 | 7 | 4 | 35 | 206 | 95.50 | 38.51 | 0.00 | 127.87 | -4 | -1.09 | -1.56 | -2.52 | -0.95 | 4 | | 91 | TRUE | |
| 9/19/2019 | 6 | 7 | 4 | 28 | 161 | 112.54 | 12.70 | 55.29 | 130.17 | -4 | -0.57 | -0.92 | -0.87 | -0.48 | 4 | | 18 | TRUE | |
| 9/19/2019 | 7 | 7 | 4 | 28 | 117 | 112.13 | 18.93 | 32.26 | 131.32 | -4 | -0.57 | -0.29 | -1.56 | 1.14 | 4 | | 0 | TRUE | |

904 912 914

| | | | | | |
|---|---|---|---|---|---|
| 20.40 | 96.63 | 117.76 | 10.36 | 84.44 | 134.25 |
| 13.35 | 69.77 | 6.79 | 8.09 | 33.46 | 9.74 |

FIG. 17

IDENTIFYING AND QUANTIFYING CONGESTION WITHIN A TRAFFIC STREAM

INTRODUCTION

The subject disclosure relates to identifying and quantifying congestion within a traffic stream, including providing output for navigating a vehicle based on risk attributable to traffic conditions and, in particular, to evaluating a congested traffic stream and adjusting a route or heading of a vehicle to lower its risk or avoid the congestion.

Autonomous vehicles monitor their surroundings in order to be able to navigate through traffic. While being able to evaluate their immediate surroundings, these vehicles are generally unaware of large-scale traffic issues outside of their immediate awareness. In particular, current navigation systems do not have the ability to assess traffic conditions as a whole and to determine a risk level of a roadway, such as level at which traffic may become unstable and pose a danger to the vehicle or hinder movement of the vehicle. Accordingly, it is desirable to be able to provide a vehicle with suitable knowledge of upcoming traffic conditions that can affect its mobility and safety. Further, it is desirable to identify and quantify congested traffic streams to allow analysis of traffic congestion to predict the span and duration of such congestions and predict how such congestion will spread.

SUMMARY

According to several aspects, a method of identifying and quantifying congestion within a traffic stream includes obtaining, with a server, over time, telemetric data from a plurality of vehicles traveling within a plurality of normalized road segments, determining, with the server, a property of each normalized road segment based on the telemetric data and a road profile for each of the plurality of normalized road segments, determining, with the server, a disruption score indicative of a level of disruption in a traffic flow within each of the plurality of normalized road segments based on the property, for each of the plurality of normalized road segments, determining, with the server, if the traffic flow is congested, identifying, with the server, a congested traffic stream, wherein the congested traffic stream includes a plurality of contiguous normalized road segments that have congested traffic flow, and providing, with the server, an output signal including information related to traffic congestion within the traffic stream.

According to another aspect, the identifying a congested traffic stream, wherein the congested traffic stream includes a plurality of contiguous normalized road segments that have congested traffic flow further includes mapping congested cells within a two-dimensional spatial-temporal grid of cells, wherein each cell represents a normalized road segment at a specified time.

According to another aspect, the determining if the traffic flow is congested further includes, for each cell within the two-dimensional spatial-temporal grid of cells, calculating a congestion metric based on at least one vehicle performance metric, comparing the calculated congestion metric to a pre-determined threshold, and identifying congestion within the cell when the calculated congestion metric exceeds the pre-determined threshold.

According to another aspect, the determining if the traffic flow is congested further includes, for each cell within the two-dimensional spatial-temporal grid of cells, calculating a spatial temporal slow traffic proportion, comparing the calculated spatial temporal slow traffic proportion to a pre-determined threshold, and identifying congestion within the cell when the calculated spatial temporal slow traffic proportion exceeds the pre-determined threshold.

According to another aspect, the identifying a congested traffic stream, wherein the congested traffic stream includes a plurality of contiguous road segments that have congested traffic flow further includes classifying a level of congestion within each cell based on the calculated spatial temporal slow traffic proportion.

According to another aspect, the method further includes quantifying the congested traffic stream by identifying a region, span and duration of the congested traffic stream.

According to another aspect, the method further includes quantifying the congested traffic stream by mapping at least one vehicle behavior metric within the region of the congested traffic stream within the two-dimensional spatial-temporal grid of cells.

According to another aspect, the method further includes outputting the notification signal to at least one of a display on a traffic monitoring device for analysis of the traffic flow, a sign to be displayed to the traffic flow, and the plurality vehicles for navigating the vehicle with respect to the traffic flow.

According to another aspect, navigating the vehicle further includes at least one of selecting an alternate route for the vehicle, changing a lane in which the vehicle is moving, changing a headway for the vehicle, changing a speed of the vehicle, and changing a speed profile of the vehicle.

According to another aspect, the method further includes accumulating the telemetric data from the plurality of vehicles at regular intervals, storing the accumulated telemetric data to a trace for the plurality of vehicles and determining the property of each of the plurality of road segments from the trace.

According to another aspect, the road profile represents an expected flow of traffic over the road segment in an absence of a disruptive event.

According to another aspect, the server is a remote cloud-based server, wherein, the obtaining, with the server, over time, telemetric data from a plurality of vehicles traveling within a plurality of normalized road segments further includes receiving, with the server, transmitted telemetric data from the plurality of vehicles wirelessly.

According to another aspect, the method further includes storing the properties in a road metrics database and purging the properties from the road metrics database after a selected time period has expired.

According to several aspects of the present disclosure, a system for identifying and quantifying congestion within a traffic stream includes a server adapted to obtain, over time, telemetric data from a plurality of vehicles traveling within a plurality of normalized road segments, determine a property of each normalized road segment based on the telemetric data and a road profile representing an expected flow of traffic over the road segment in an absence of a disruptive event for each of the plurality of normalized road segments, determine a disruption score indicative of a level of disruption in a traffic flow within each of the plurality of normalized road segments based on the property, map the plurality of normalized road segments within a two-dimensional spatial-temporal grid of cells, wherein each cell represents a normalized road segment at a specified time, for each of the plurality of cells, determine if the traffic flow is congested by calculating a congestion metric based on at least one vehicle performance metric, comparing the calculated congestion metric to a pre-determined threshold, identifying congestion within the cell when the calculated congestion metric exceeds the pre-determined threshold, and classifying a level of congestion within each cell based on the calculated congestion metric, identify a congested traffic stream, wherein the congested traffic stream includes a plurality of contiguous cells that have congested traffic flow, and provide an output signal including information related to traffic congestion within the traffic stream.

According to another aspect, the data processor is further adapted to quantify the congested traffic stream by identifying a region, span and duration of the congested traffic stream, and to map at least one vehicle behavior metric within the region of the congested traffic stream within the two-dimensional spatial-temporal grid of cells.

According to another aspect, the data processor is further adapted to provide an output signal to at least one of a display on a traffic monitoring device for analysis of the traffic flow; a sign to be displayed to the traffic flow; and at least one of the plurality of vehicles for navigating the plurality of vehicles with respect to the traffic flow.

According to another aspect, the data processor is further adapted to accumulate the telemetric data from the plurality of vehicles at regular intervals, store the accumulated telemetric data to a trace for the plurality of vehicles and determine the property of each of the plurality of road segments from the trace.

According to another aspect, the data processor is further adapted to store the properties in a road metrics database and purge the properties from the road metrics database after a selected time period has expired.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

Other features, advantages and details appear, by way of example only, in the following detailed description, the detailed description referring to the drawings in which:

FIG. 17 shows a table showing various properties and related scaled or scored values.

Figure 1:
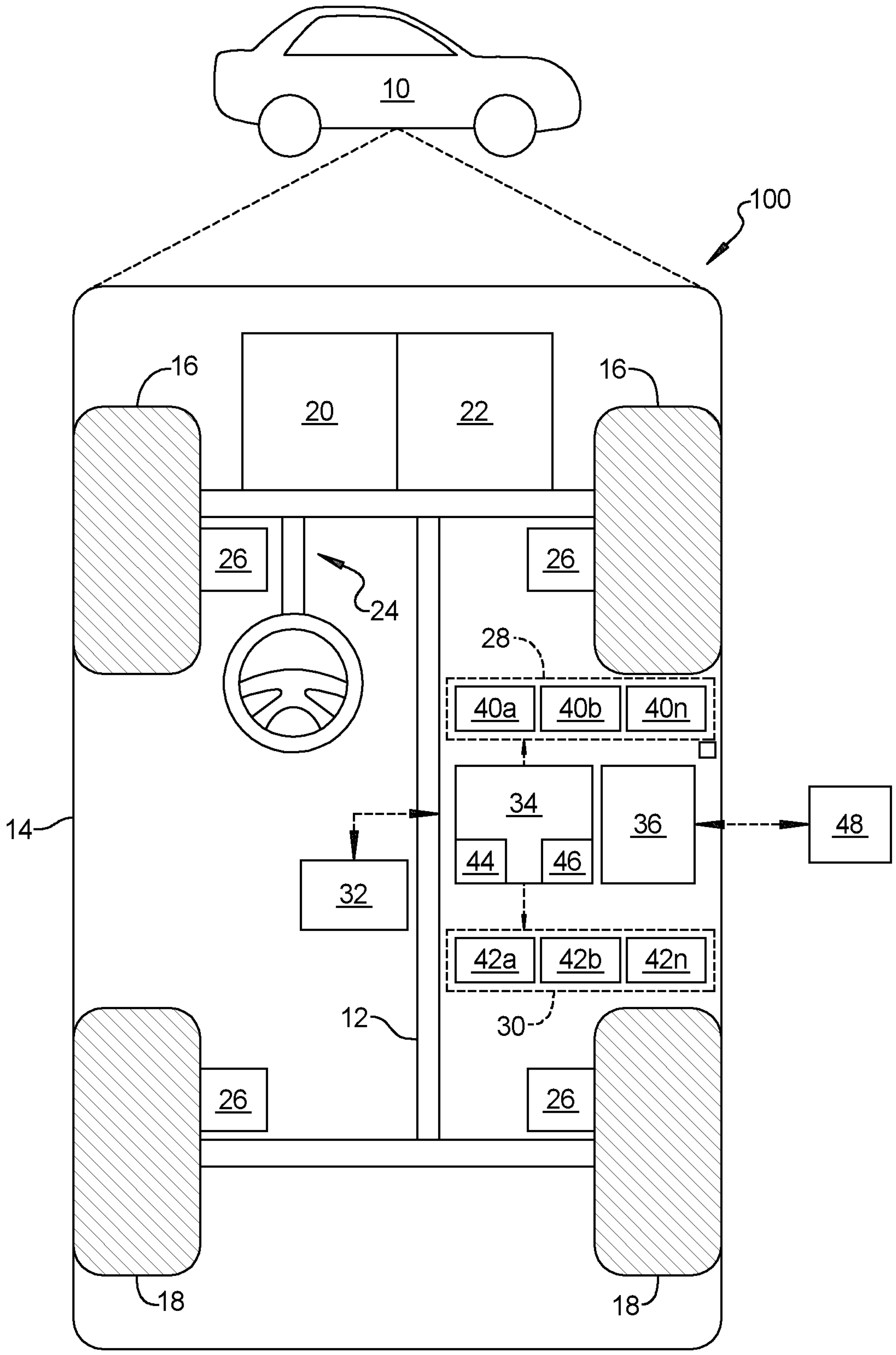
FIG. 1 shows a vehicle with an associated trajectory planning system depicted at in accordance with various embodiments.

DETAILED DESCRIPTION following description is merely exemplary in nature and is not intended to limit the present disclosure, application, or uses. Furthermore, there is no intention to be bound by any expressed or implied theory presented in the preceding technical field, background, brief summary or the following detailed description. It should be understood that throughout the drawings, corresponding reference numerals indicate like or corresponding parts and features. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality. Although the figures shown herein depict an example with certain arrangements of elements, additional intervening elements, devices, features, or components may be present in actual embodiments. It should also be understood that the figures are merely illustrative and may not be drawn to scale.

As used herein, the term "vehicle" is not limited to automobiles. While the present technology is described primarily herein in connection with automobiles, the technology is not limited to automobiles. The concepts can be used in a wide variety of applications, such as in connection with aircraft, marine craft, other vehicles, and consumer electronic components.

In accordance with an exemplary embodiment, FIG. 1 shows a vehicle 10 with an associated trajectory planning system depicted at 100 in accordance with various embodiments. In general, a system 100 for identifying and quantifying congestion within a traffic stream works in conjunction with a trajectory planning system to determine a trajectory plan for automated driving of the vehicle 10. The vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The front wheels 16 and rear wheels 18 are each rotationally coupled to the chassis 12 near a respective corner of the body 14.

In various embodiments, the vehicle 10 is an autonomous vehicle and the system 100 is incorporated into the autonomous vehicle 10 (hereinafter referred to as the autonomous vehicle 10). The autonomous vehicle 10 is, for example, a vehicle that is automatically controlled to carry passengers from one location to another. The autonomous vehicle 10 is depicted in the illustrated embodiment as a passenger car, but it should be appreciated that any other vehicle including motorcycles, trucks, sport utility vehicles (SUVs), recreational vehicles (RVs), etc., can also be used. In an exemplary embodiment, the autonomous vehicle 10 is a so-called Level Four or Level Five automation system. A Level Four system indicates "high automation", referring to the driving mode-specific performance by an automated driving system of all aspects of the dynamic driving task, even if a human driver does not respond appropriately to a request to intervene. A Level Five system indicates "full automation", referring to the full-time performance by an automated driving system of all aspects of the dynamic driving task under all roadway and environmental conditions that can be managed by a human driver.

As shown, the autonomous vehicle 10 generally includes a propulsion system 20, a transmission system 22, a steering system 24, a brake system 26, a sensor system 28, an actuator system 30, at least one data storage device 32, a controller 34, and a communication system 36. In an embodiment in which the autonomous vehicle 10 is an electric vehicle, there may be no transmission system 22. The propulsion system 20 may, in various embodiments, include an internal combustion engine, an electric machine such as a traction motor, and/or a fuel cell propulsion system. The transmission system 22 is configured to transmit power from the propulsion system 20 to the vehicle's front wheels 16 and rear wheels 18 according to selectable speed ratios. According to various embodiments, the transmission system 22 may include a step-ratio automatic transmission, a continuously-variable transmission, or other appropriate transmission. The brake system 26 is configured to provide braking torque to the vehicle's front wheels 16 and rear wheels 18. The brake system 26 may, in various embodiments, include friction brakes, brake by wire, a regenerative braking system such as an electric machine, and/or other appropriate braking systems. The steering system 24 influences a position of the front wheels 16 and rear wheels 18. While depicted as including a steering wheel for illustrative purposes, in some embodiments contemplated within the scope of the present disclosure, the steering system 24 may not include a steering wheel.

The sensor system 28 includes one or more sensing devices **40*a*-40*n* that sense observable conditions of the exterior environment and/or the interior environment of the autonomous vehicle 10. The sensing devices 40*a*-40*n* can include, but are not limited to, radars, lidars, global positioning systems, optical cameras, thermal cameras, ultrasonic sensors, and/or other sensors. The cameras can include two or more digital cameras spaced at a selected distance from each other, in which the two or more digital cameras are used to obtain stereoscopic images of the surrounding environment in order to obtain a three-dimensional image. The sensing devices 40*a*-40*n* can includes sensors that monitor dynamic variables of the vehicle, such as its velocity, its acceleration, a number of times that the brake is applied, etc. The actuator system 30 includes one or more actuator devices 42*a*-42*n* that control one or more vehicle features such as, but not limited to, the propulsion system 20, the transmission system 22, the steering system 24, and the brake system 26**.

The controller 34 includes at least one processor 44 and a computer readable storage device or media 46. The at least one data processor 44 can be any custom made or commercially available processor, a central processing unit (CPU), a graphics processing unit (GPU), an auxiliary processor among several processors associated with the controller 34, a semi-conductor based microprocessor (in the form of a microchip or chip set), a macro-processor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the at least one data processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the vehicle 10.

The instructions may include one or more separate programs, each of which includes an ordered listing of executable instructions for implementing logical functions. The instructions, when executed by the at least one processor 44, receive and process signals from the sensor system 28, perform logic, calculations, methods and/or algorithms for automatically controlling the components of the autonomous vehicle 10, and generate control signals to the actuator system 30 to automatically control the components of the autonomous vehicle 10 based on the logic, calculations, methods, and/or algorithms. Although only one controller 34 is shown in FIG. 1, embodiments of the autonomous vehicle 10 can include any number of controllers 34 that communicate over any suitable communication medium or a combination of communication mediums and that cooperate to process the sensor signals, perform logic, calculations, methods, and/or algorithms, and generate control signals to automatically control features of the autonomous vehicle 10.

In various embodiments, one or more instructions of the controller 34 are embodied in the trajectory planning system and, when executed by the at least one data processor 44, generates a trajectory output that addresses kinematic and dynamic constraints of the environment. For example, the instructions receive as input process sensor and map data. The instructions perform a graph-based approach with a customized cost function to handle different road scenarios in both urban and highway roads.

The communication system 36 is configured to wirelessly communicate information to and from other entities 48, such as but not limited to, other vehicles ("V2V" communication) infrastructure ("V2I" communication), remote systems, remote servers, cloud computers, and/or personal devices. In an exemplary embodiment, the communication system 36 is a wireless communication system configured to communicate via a wireless local area network (WLAN) using IEEE 802.11 standards or by using cellular data communication. However, additional or alternate communication methods, such as a dedicated short-range communications (DSRC)

channel, are also considered within the scope of the present disclosure. DSRC channels refer to one-way or two-way short-range to medium-range wireless communication channels specifically designed for automotive use and a corresponding set of protocols and standards.

Figure 2:
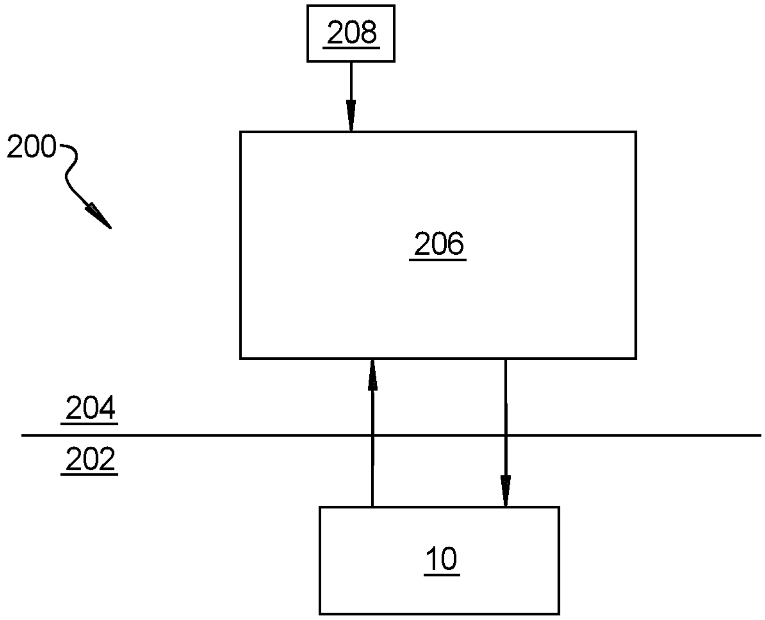
FIG. 2 shows a schematic view of an architecture of a system suitable for identifying and quantifying congested traffic streams using crowd-sourced telemetric data, in an embodiment.
Figure 3:
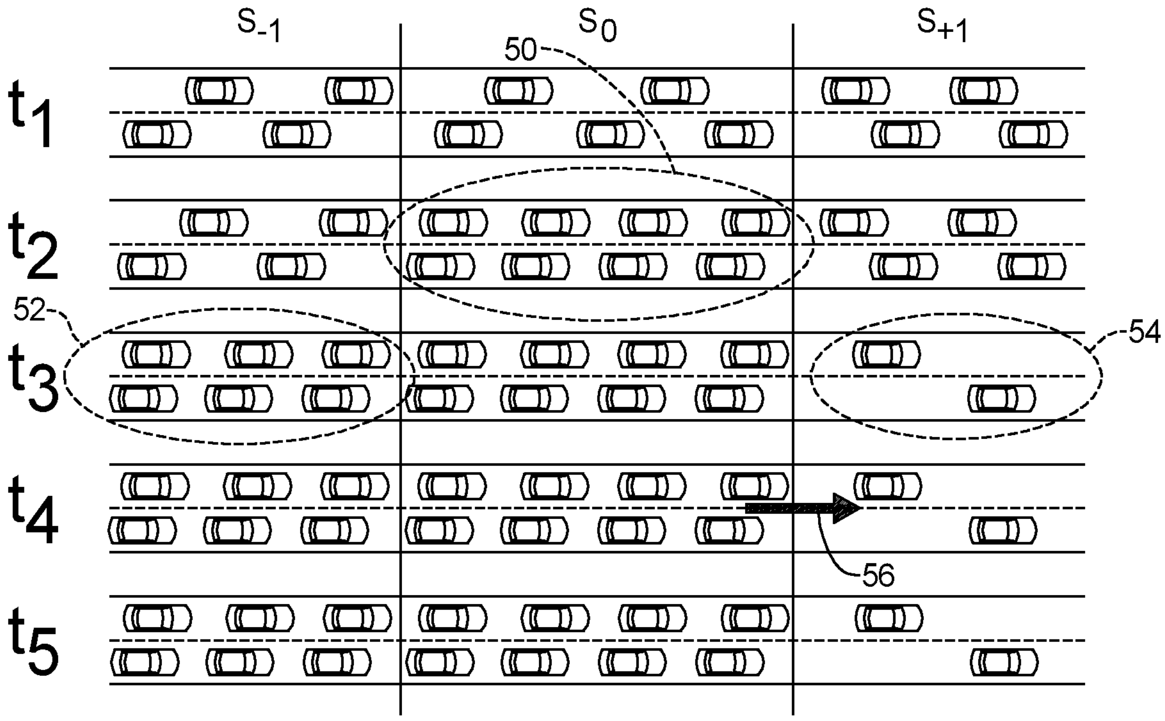
FIG. 3 is a schematic diagram illustrating traffic congestion over time.

Referring to FIG. 2, a schematic view is shown of an architecture of a system 200 suitable for identifying and quantifying congestion within a traffic stream, and informing the vehicle 10 of a road risk using crowd-sourced telemetric data. Referring to FIG. 3, traffic congestion, or bottleneck congestion, is a condition in transportation that is characterized by slower speeds, longer trip times, and increased vehicular queuing due to a localized disruption in the traffic stream. FIG. 3 illustrates the evolution of a disrupted traffic stream, leading to congestion. Bottleneck congestion can be stationary or dynamic, and can be caused by many different things, such as, but not limited to construction zones, accident sites that temporarily close traffic lanes, narrowing a low-capacity highway, terrain (up hill segments, sharp curves, etc.), poorly timed traffic lights, slow vehicles that disrupt upstream traffic flow (moving bottleneck), and rubbernecking (slowing down to observe traffic situations).

As shown in FIG. 3, at time $t_1$, the traffic flows in a synchronized free-flow. At time $t_2$, something happens within segment $S_0$, causing the traffic flow to slow and compact within segment $S_0$, as indicated at 50. At time $t_3$, upcoming traffic within segment $S_{-1}$ slows and compacts as it approaches segment $S_0$ due to the compacted and slowed traffic within segment $S_0$, as indicated at 52. Forward moving traffic within segment $S_{+1}$ moves forward freely, as it is in front of the compacted/slowed traffic within segment $S_0$, as indicated at 54. At time $t_4$, traffic moving from segment $S_0$ to $S_{+1}$ is released to a free flow state as the vehicles from segment $S_0$ pass the cause of the compacting/slowing within segment $S_0$, as indicated by arrow 56. At time $t_5$, traffic within segments $S_0$ and $S_{-1}$ remain compacted and slowed until whatever caused the congestion is cleared.

Referring again to FIG. 2, the system 200 includes operation within a vehicle domain 202 and a cloud domain 204. The vehicle domain 202 includes the autonomous vehicle 10. The cloud domain 204 includes one or more remote servers 206. Information is sent back and forth between the autonomous vehicle 10 in the vehicle domain 202 and the one or more remote servers 206 in the cloud domain 204.

In the vehicle domain 202, the autonomous vehicle 10 obtains measurements about its operation, such as its velocity, acceleration, latitude, longitudinal, amount of braking, surface conditions, locations of detected targets, etc., using the sensing devices 40*a*-40*n*. These measurements are communicated to the one or more remote servers 206. The remote server 206 obtains, over time, telemetric data from a plurality of vehicles traveling within a plurality of normalized road segments $S_{-1}$, $S_0$, $S_{+1}$. Previously, such data acquisition by vehicles traveling on a roadway were collected within road segments based on nodes (intersections) and edges (road segments between and interconnecting nodes). Such methods relied on data collected over irregular segment lengths. This results in distorted traffic speed measurements and makes analysis less sensitive to detection, assessment and tracking of traffic congestion which evolves over time. Here, road segments are normalized, wherein each road segment is the same length, such as 500 meters. Using normalized, equal length road segments, makes the data collected within each road segment more robust when compiled with and compared to similar data from other road segments within the traffic stream. Further, the system and method of the present disclosure only uses crowd sourced data collected directly from vehicles. When data is collected via connected smart personal devices (cell phones, ipads, laptops, etc.) the data may be skewed by vehicles with multiple passengers, wherein data for that vehicle is over-represented. In the cloud domain 204, the one or more remote servers 206 compute various risk parameters based from the measurements from the autonomous vehicles 10 and a profile of the road segments being traversed by the autonomous vehicles.

The profile can be received at the one or more remote servers 206 from a profile database or a profile service 208. The profile service 208 obtains telemetric data from a plurality of vehicles and organizes the data by road segment, time frame, etc. The profile is calculated to represent traffic along a selected road segment for a selected time period, such as an hour of the day, a quarter hour of the day, a seasonal time period, etc. In another embodiment, the one or more remote servers 206 can compile profile data on its own using telemetric data obtained from a plurality of vehicles traversing a road segment.

A profile represents an expected flow of traffic over the road segment for the time period. The road profile generally represents the stable flow of traffic over the road segment for the time period. The stable flow of traffic is flow of traffic in the absence of a destabilizing influence on the traffic flow, such as road work, an accident, bad road conditions, etc. Measurements made of the vehicle and of surrounding traffic over a road segment level are referred to herein as metrics. The metrics are interpreted using a model such as a Transportation Research Model to generate one or more properties. The one or more properties are used to generate a profile of the traffic flow, which is indicated by mean and standard deviation of the one or more properties.

The road profile for a road segment is represented by an average value (mean) and an expected variation (standard deviation) of one or more properties over the road segment for the time period. The properties can include, but are not limited to, travel speed uncertainty, pedal usage uncertainty, number of vehicles observed, average speed and speed changes, distribution of speeds and speed changes, hard braking and acceleration, number of full stops and number of idle stops.

The one or more remote servers 206 compile the measurements from the vehicle 10 and compare the calculated properties to the road profile to determine the degree to which each property departs from a stable flow of traffic for the selected road segment for a selected time.

The uncertainty a driver or the vehicle faces in a traffic stream can be represented by a distribution. For example, travel speed uncertainty can be obtained as an entropy value of the velocity distribution, as given by Eq. (1):

$$E[v] = -\sum\left(p_{v_i} \times \ln\left(p_{v_i}\right)\right) \quad \text{Eq. (1)}$$

where $p_{v_i}$ is a probability associated with a given velocity $v_i$. Similarly, pedal usage uncertainty can be obtained as an entropy value of the velocity change distribution, as given by Eq. (2):

$$E[dv] = -\sum\left(p_{dv_i} \times \ln\left(p_{dv_i}\right)\right) \quad \text{Eq. (2)}$$

where $p_{dv_i}$ is a probability associated with a given deceleration or acceleration $d_{v_i}$. For the entropies, a lower bound of zero represents complete consistency of a travel speed of the vehicle along a road segment. The upper bound represents complete uncertainty in the travel speed and a pedal usage needed to match the travel speed of the vehicle to the speed of the surrounding traffic flow. The entropy value is a property that can be calibrated to profile stable flow for a road segment for a given time period.

One or more remote servers 206 determine a disruption score based on the property values of travel speed uncertainty, pedal usage uncertainty, and vehicle flow. The disruption score can be used to identify an instability in traffic flow, such as an unexpected event that increases a level of headway dynamics. The disruption score is in indication of a level of disruption in the traffic flow.

Figure 4:
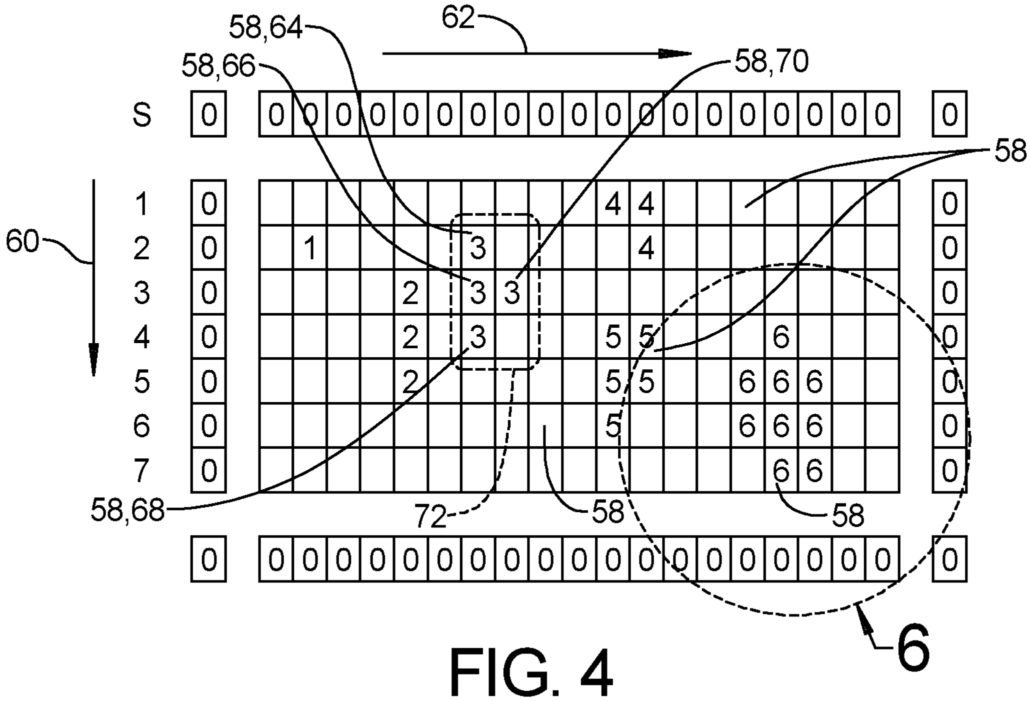
FIG. 4 is a schematic diagram of a two-dimensional spatial-temporal grid of cells representing road segments of a traffic stream over time.

Referring to FIG. 4, in an exemplary embodiment, the remote server is adapted to map the plurality of normalized road segments within a two-dimensional spatial-temporal grid 57 of cells 58. The road segments are shown along the left side of the grid, wherein the direction of travel is indicated by arrow 60. Time is illustrated along the top of the grid, moving left to right, as indicated by arrow 62. Each cell 58 represents an individual road segment that has been normalized, so each cell 58 represents a road segment of the same length, such as 500 meters. Further, each cell 58 represents a normalized temporal framework, wherein each cell represents a uniform time window.

For each of the plurality of cells, the remote server is adapted to determine if the traffic flow is congested by calculating a congestion metric based on at least one vehicle performance metric, comparing the calculated congestion metric to a pre-determined threshold, identifying congestion within the cell when the calculated congestion metric exceeds the pre-determined threshold, and classifying a level of congestion within each cell based on the calculated congestion metric. Vehicle performance metrics may include, but are not limited to vehicle speed, hard braking events, hard acceleration events, high G-forces, etc. The congestion metric may be calculated using a single vehicle performance metric, or any combination of multiple vehicle performance metrics.

In an exemplary embodiment, the congestion metric is based on spatial temporal slow traffic proportion (ST) which is defined as the proportion of speeds below a maximum speed, and is given by Eq (3):

$$ST = \frac{1}{n}\sum n(v)\forall\ v \leq v_{max}^{ST} \qquad \text{Eq. (3)}$$

The spatial temporal slow traffic proportion for a given cell is compared to a pre-determined threshold, t, where C=1 when ST is greater than t. Thus, for each cell, if ST is greater than t, than the cell is identified as having traffic flow that is congested. As described, each cell is identified as either congested or not. However, in another exemplary embodiment, when identifying a congested traffic stream, wherein the congested traffic stream includes a plurality of contiguous road segments that have congested traffic flow, the remote server 206 is further adapted to classify a level of congestion within each cell based on the calculated spatial temporal slow traffic proportion, wherein the level of congestion is given by Eq. (4):

$$CL = ST \in \{[0, \tau], (\tau, 25], (25, 50], (50, 75], (75, 100]\} \rightarrow \{0, 1, 2, 3, 4\} \qquad \text{Eq. (4)}$$

Wherein, the congestions levels 0, 1, 2, 3, 4 correspond to relative congestion levels: no congestion, light congestion, moderate congestion, heavy congestion and severe congestion.

In an exemplary embodiment, data is collected and updated every five minutes, thus each cell within the two-dimensional spatial-temporal grid represents a road segment during a specific 5 minute temporal window. Thus, referring to FIG. 4, for example, the two-dimensional spatial-temporal grid provides a collection of data for seven road segments, numbered 1-7 along a vertical left edge of the grid, over eighteen time segments. Thus, cells that have been identified as having a congested traffic flow are numbered, either simply to indicate congestion, such as with a 0 or 1, or with a numerical representation of congestion that also connotates the level of severity of the congestion. For example, referring to FIG. 4, in a first cell 64, representing traffic condition within a second segment at 6:00 am, the traffic flow is identified as congested. Further, congested traffic flow is identified in a second cell 66, representing traffic condition within a third segment at 6:00 am, and in a third cell 68, representing traffic condition within a fourth segment at 6:00 am. Finally, traffic flow is identified as congested within a fourth cell 70, representing traffic condition within the third segment at 6:05 am.

The first, second, third and fourth cells 64, 66, 68, 70 within the two-dimensional spatial-temporal grid represent a congested traffic stream, wherein the congested traffic stream includes a plurality of contiguous cells that have congested traffic flow. Based on the data populating the two-dimensional spatial-temporal grid 57, the remote server will identify a congested traffic stream 72 based on the first, second, third and fourth cells 64, 66, 68, 70.

The disruption score as well as other data can be communicated from the one or more remote servers 206 to the autonomous vehicle 10. The disruption score can also be used to determine an instruction for the autonomous vehicle 10, and such instruction can be sent from the one or more remote servers 206 to the autonomous vehicle 10. The autonomous vehicle 10 can perform a navigational operation based on the instructions, disruption score, and/or other data from the one or more servers. Alternatively, if the autonomous vehicle 10 is being driven manually by a driver, the driver can read the instructions and operate the vehicle 10 accordingly.

Figure 5:
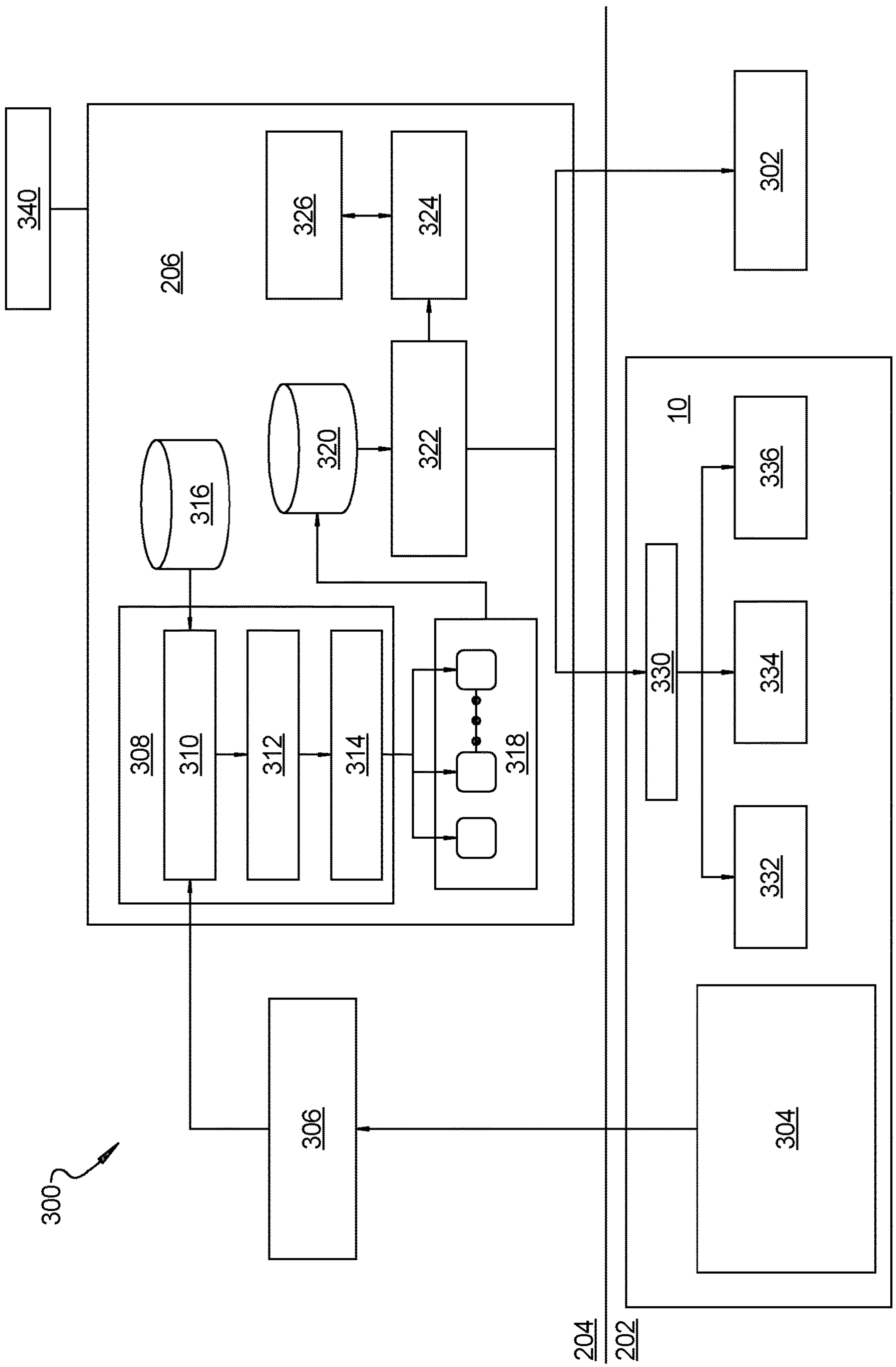
FIG. 5 shows a schematic diagram showing details of the system of FIG. 2.

FIG. 5 shows a schematic diagram 300 showing details of the system 200 of FIG. 2. The vehicle domain 202 includes the autonomous vehicle 10 and an infrastructure sign 302. The cloud domain 204 includes a telemetry ingestion processor 306 and the one or more remote servers 206.

The vehicle 10 includes at least a telemetric device 304 and a navigation module 330. The telemetric device 304 captures various telemetric data or measurements including, but not limited to, latitude of a road user, longitudinal of the road user, a timestamp, a heading of the road user, a speed or velocity of the road user, a surface condition of a road being traversed by the road user, any targets detected by the road user, etc. The telemetric device 304 communicates this telemetric data from the vehicle 10 to the cloud domain 204.

In the cloud domain 204, the telemetry ingestion processor 306 receives the telemetric data from the vehicle 10 and converts the format of the data to a format suitable for use at the remote servers 206. The telemetry ingestion processor 306 inputs data at regularly scheduled intervals, such as every three seconds, from the autonomous vehicle 10 to the one or more remote servers 206.

The one or more remote servers 206 process the data from the telemetry ingestion processor 306 to determine a risk assessment for the vehicle. The one or more remote servers 206 include a data preprocessor 308, a road safety analyzer 318, a road metrics database 320, a road summary service 322, a routing service 324 and a routing engine 326.

The data preprocessor 308 performs various operations to prepare the data for analysis, including map matching 310, vehicle data grouping 312 and data publication at a publication or subscription server 314. Map matching 310 includes comparing the longitude and latitude of the data to a map from a map database 316 in order to determine the location of the autonomous vehicle 10 at various times. While the autonomous vehicle 10 is within the road segment, the data preprocessor performs vehicle data grouping 312 in which the data is accumulated. Once the vehicle has left the road segment, the accumulated data is grouped as a trace representative of the road segment. The trace is published at a publication or subscription server 314. In general, the trace is published to the road safety analyzer 318.

The road safety analyzer 318 receives the trace from the data preprocessor 308 and performs various calculations. In particular, the road safety analyzer 318 compares the trace data to the road profile and determines one or more properties of the road segment from the trace. The road safety analyzer 318 also computes a performance value or disruption value associated with one or more properties and determines a likelihood of traffic disruption or of an adverse driver experience, such as stopped traffic, stop-and-go traffic, etc. Operations of the road safety analyzer 318 are discussed herein with respect to FIG. 5.

The properties and disruption values determined at the road safety analyzer 318 can then be stored to the road metrics database 320. The road metrics database 320 provides a historical database that stores this data for a predetermined time frame and accumulates new data from other traces obtained by other vehicles over the time period. In various embodiments, the historical data can be held over a short time frame, such as 15 minutes, or over a long timeframe, such as one month.

The road summary service 322 pulls data from the road metrics database 320 to provide instructions for the autonomous vehicle 10. For example, when the vehicle 10 is traversing a road segment during a selected time period, the road summary service 322 can pull historical data from the road metrics database 320 for the selected road segment for the selected time period and supply this data to the vehicle 10. In particular, the road summary service 322 can provide a disruption value and/or road properties for the road segment to the vehicle 10. The road summary service 322 can also provide a notification signal upon comparison of the disruption value to a selected disruption threshold, such as when the disruption value is greater than the selected disruption threshold.

At the vehicle 10, the data and/or notification signal is received at a navigation module 330. The navigation module 330 can determine a course of action to implement at the vehicle 10. For example, the navigation module 330 can perform route selection 332 to choose a safer route than that of the road segment. Alternatively, the navigation module 330 can perform a lane selection 334 in order to change a lane in which the vehicle 10 is moving to a lane having a greater degree of safety. In addition, the navigation module 330 can manage the operation of the vehicle 10 by, for example, managing motion 336 such as a headway for the vehicle 10 and/or a speed, or speed profile, or a level of acceleration or deceleration of the vehicle 10, etc.

In another embodiment, the data and/or notification signal from the road summary service 322 can also be sent to the infrastructure sign 302, which can display this data or a suitable warning to the traffic at large. In another embodiment, the data and/or notification signal can be sent to a traffic monitor 340 or traffic monitoring device or server which is being observed by a traffic engineer or other user. The data and/or the notification signal can be shown at a display of the traffic monitor 340, such as at a dashboard operating at the display. The notification signal therefore controls a relation between the vehicle and the traffic flow over the road segment, generally in order to reduce a disruption in the traffic flow over the road segment. The notification sent to the traffic engineer can be used for analysis of the traffic flow in order to design new traffic regulations or traffic systems. The relation between the vehicle and the traffic flow is also achieved when the notification signal is sent to the infrastructure sign 302 to display a traffic flow warning or advisory to the traffic flow as well as when the notification signal is sent to the vehicle for control of the vehicle.

The routing service 324 of the one or more remote servers 206 receives data from the road summary service 322 and determines a complexity of the traffic pattern. The routing engine 326 can determine an alternate route based on a planned path or destination of the vehicle given the traffic pattern. The alternate route can be supplied to the autonomous vehicle 10.

Figure 6:
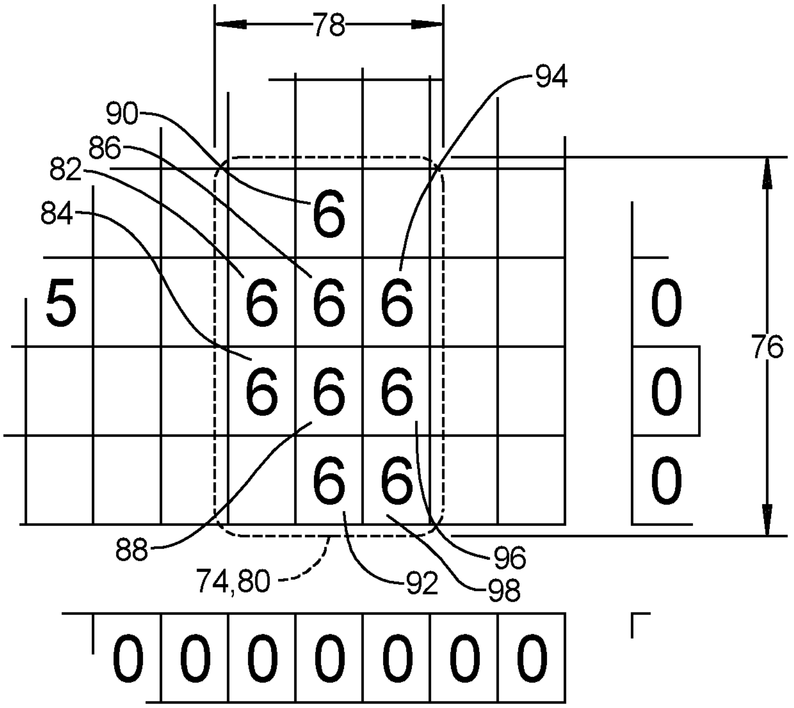
FIG. 6 is an enlarged portion of FIG. 4, and indicated by the circle labelled "FIG. 6" in FIG. 4.

In an exemplary embodiment, the remote server 206 is further adapted to quantify the congested traffic stream by identifying a region 74, span 76 and duration 78 of a congested traffic stream 78. Referring to FIG. 6, the congested traffic stream 80 is identified, wherein first and second cells 82, 84, representing road segments 5 and 6, become congested at 6:40. At 6:45, the traffic congestion remains within road segments 5 and 6, as indicated at third and fourth cells 86, 88, and has spread to fifth and sixth cells 90, 92 indicating that the traffic congestion has spread to road segments 4 and 7, thus the length of the traffic congestion is increasing. Finally, at 6:50, traffic congestion continues within road segments 5, 6 and 7, as indicated within seventh, eighth and ninth cells 94, 96, 98.

The region 74 is the minimum and maximum contiguous road segments and time periods defined by the connected cells (the congested traffic stream 80). The span 76 is the length of roadway, or the number of consecutive road segments defined by the congested traffic stream 80. The span 76 is given by span 76=n(s)×segment length. As shown in FIG. 6, the span 76 comprises road segments 4, 5, 6 and 7. Thus, assuming road segment lengths of 500 meters, as mentioned above, the span 76 would be two kilometers. The duration 78 is the total minutes defined by the congested traffic stream 80. Duration 80 is given by duration 80=n(t)× period minutes. As shown in FIG. 6, the congested traffic stream 80 timeline extends across three cell columns, wherein each cell 58 is a standardized time window of 5 minutes. The congested traffic stream 80 begins at 6:40 and continues until 6:55, thus fifteen minutes.

Figure 7:
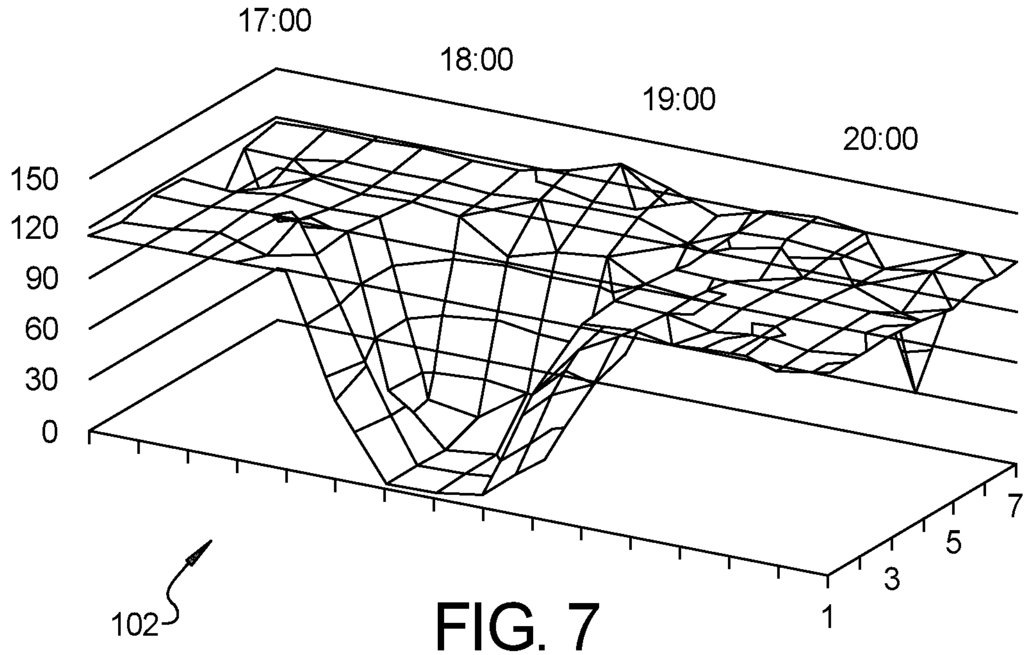
FIG. 7 is a schematic diagram of a plot of vehicle speed over six road segments over time.
Figure 8:
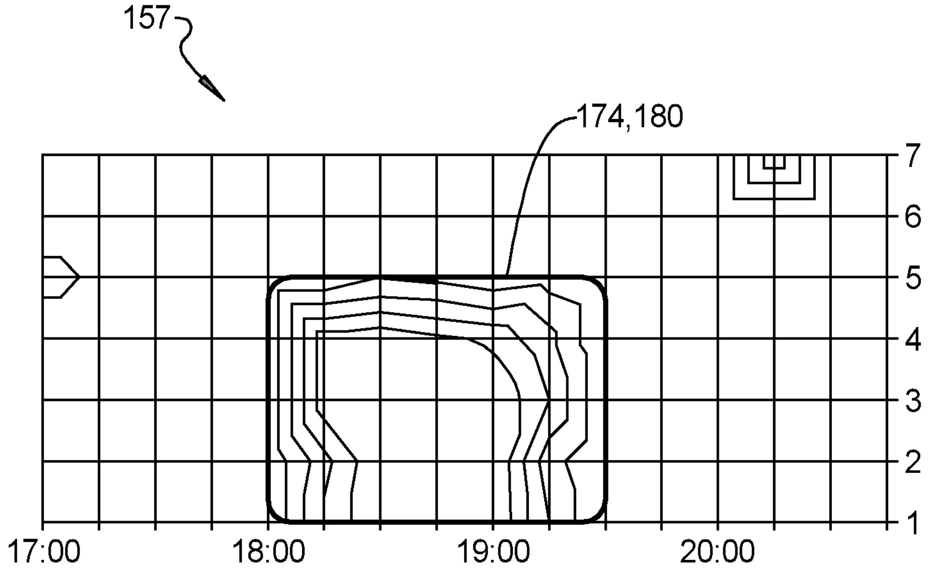
FIG. 8 is a schematic diagram of a two-dimensional spatial-temporal grid of cells representing road segments of a traffic stream over time, wherein a congested traffic stream is plotted based on data from FIG. 7.

In another exemplary embodiment, the remote server 206 is further adapted to map at least one vehicle behavior metric within the region 74 of the congested traffic stream 80 within the two-dimensional spatial-temporal grid 57 of cells 58. As discussed above, vehicle performance metrics may include, but are not limited to vehicle speed, hard braking events, hard acceleration events, high G-forces, etc. The congestion metric used to identify congested traffic within a cell 58 may be calculated using a single vehicle performance metric, or any combination of multiple vehicle performance metrics. Referring to FIG. 7, a plot 102 illustrates vehicle speed across six road segments beginning at 17:00 through 20:00. Referring to FIG. 8, based on the drop in vehicle speed a congested traffic stream 180 is identified and shown visually on a two-dimensional spatial-temporal grid 157.

Figure 9:
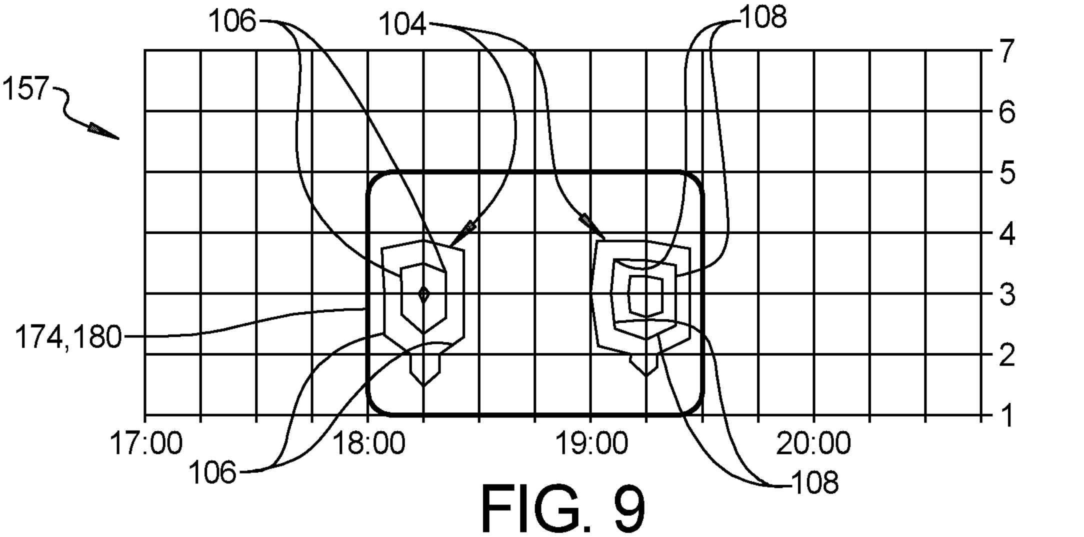
FIG. 9 is a schematic diagram of the two-dimensional spatial-temporal grid shown in FIG. 8, wherein hard braking events have been plotted within a region of the congested traffic stream.

As discussed above, other vehicle performance metrics may be used in conjunction with vehicle speed to determine congestion within a cell 58. Such vehicle performance metrics may further be used to quantify the congested traffic stream 180, by mapping at least one vehicle behavior metric within the region 174 of the congested traffic stream 180 within the two-dimensional spatial-temporal grid 157 of cells 58. Referring to FIG. 9, hard braking events 104 are mapped onto the two-dimensional spatial-temporal grid 157. The location and timing of hard braking events 104 may be used to quantify the congested traffic stream 180. For example, as shown, hard braking events 104 take place within centrally located road segments, as indicated by cells 106 with hard braking 104, at the beginning of the congested traffic stream 180 (about 18:15) and, as indicated by cells 108 with hard braking 104, near the end of the congested traffic stream 180 (about 19:15). This illustrates that the hard braking events take place as oncoming traffic enters the span of the congested traffic stream 180 due to an event causing the compaction and slowing of traffic within the congested stream. During the middle of the congested traffic stream (from about 18:30 to about 19:00) no (or very few) hard braking events occur because traffic has normalized to the congested state and drivers are not caught off guard. Finally, at the end of the congested traffic stream 180 (from about 19:00 to about 19:30), more hard braking events are occurring, possibly due to the traffic attempting to accelerate immediately after passing the cause of the congestion.

Figure 10:
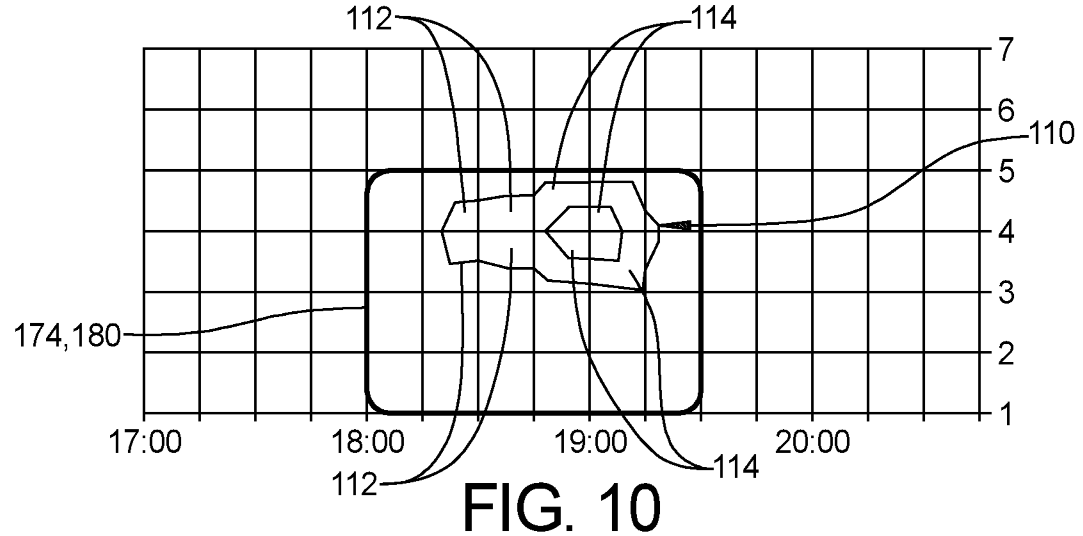
FIG. 10 is a schematic diagram of the two-dimensional spatial-temporal grid shown in FIG. 8, wherein hard acceleration events have been plotted within the region of the congested traffic stream.

Referring to FIG. 10, hard acceleration events 110 are mapped onto the two-dimensional spatial-temporal grid 157. The location and timing of hard acceleration events 110 may be used to quantify the congested traffic stream 180. For example, as shown, hard acceleration events 110 take place within road segments near the end of the span of the congested traffic stream. The grid 157 shows that at the beginning to the congested traffic stream 180 (about 18:15 to about 18:45), as indicated within cells 112, there are a low concentration of hard acceleration events. This may be due to traffic accelerating after they have passed the cause of the congestion, but doing so cautiously, as the cause has not been removed. The grid 157 shows that near the end of the congested traffic stream 180 (about 18:45 to about 19:15), as indicated within cells 114, there is a much higher concentration of hard acceleration events 110. This may be due to traffic accelerating aggressively after having passed the cause of the congestion, and such acceleration being more aggressive due to the fact that drivers may know the cause of the congestion has been removed, or drivers may simply be frustrated that they have been forced to wait within a congested traffic stream for a length of time, and due to impatience, accelerate aggressively as soon as conditions allow.

Figure 11:
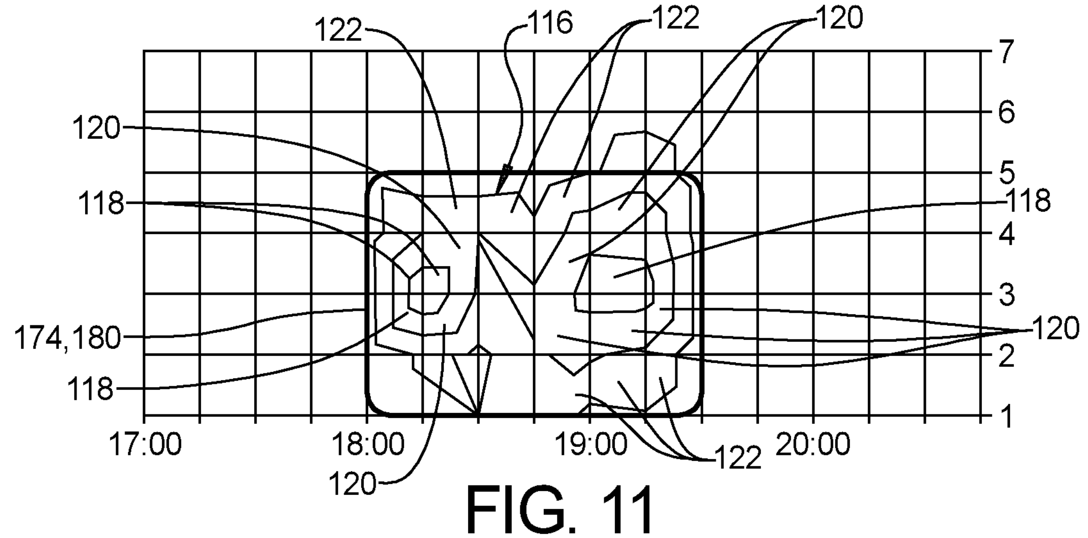
FIG. 11 is a schematic diagram of the two-dimensional spatial-temporal grid shown in FIG. 8, wherein G-forces have been plotted within the region of the congested traffic stream.

Referring to FIG. 11, G-force levels 116 are mapped onto the two-dimensional spatial-temporal grid 157. The location and timing of higher G-force levels may be used to quantify the congested traffic stream 180. For example, as shown, the highest G-force levels for the congested traffic stream occur within cells 118, more moderate G-force levels occurs within cells 120, and lower G-force levels occur within cells 122. As shown, the highest G-forces are experienced within cells 118 at the middle of the span of the congested traffic stream and near the beginning and end of the duration of the congested traffic stream 180. This is likely due to unexpected maneuvers as vehicles approach and are possibly caught off guard by the congested traffic, and hard accelerations as vehicle leave the congested traffic stream 180. Moderate a lower G-forces are experienced across the entire region of the congested traffic stream 180 as vehicles navigate the congested environment.

The remote server 206 as well as servers and data processors within individual vehicles can use the data provided by the two-dimensional spatial-temporal grids 157 shown in FIG. 8, FIG. 9, FIG. 10 and FIG. 11 to further quantify the nature of congested traffic streams 180. This allows profiling of areas that may be susceptible to congestion and be able to predict intensity levels of such congestion. Further, data from plots, such as those shown in FIG. 9, FIG. 10 and FIG. 11 allow development of predictive models to anticipate risk of congestion at an area as well as characteristics such as how long the congestion is likely to last, how many road segments (and thus, length of highway) that will be affected by the congestion, and the nature of the congestion (full stop, slow traffic, intermittent, etc.).

Figure 12:
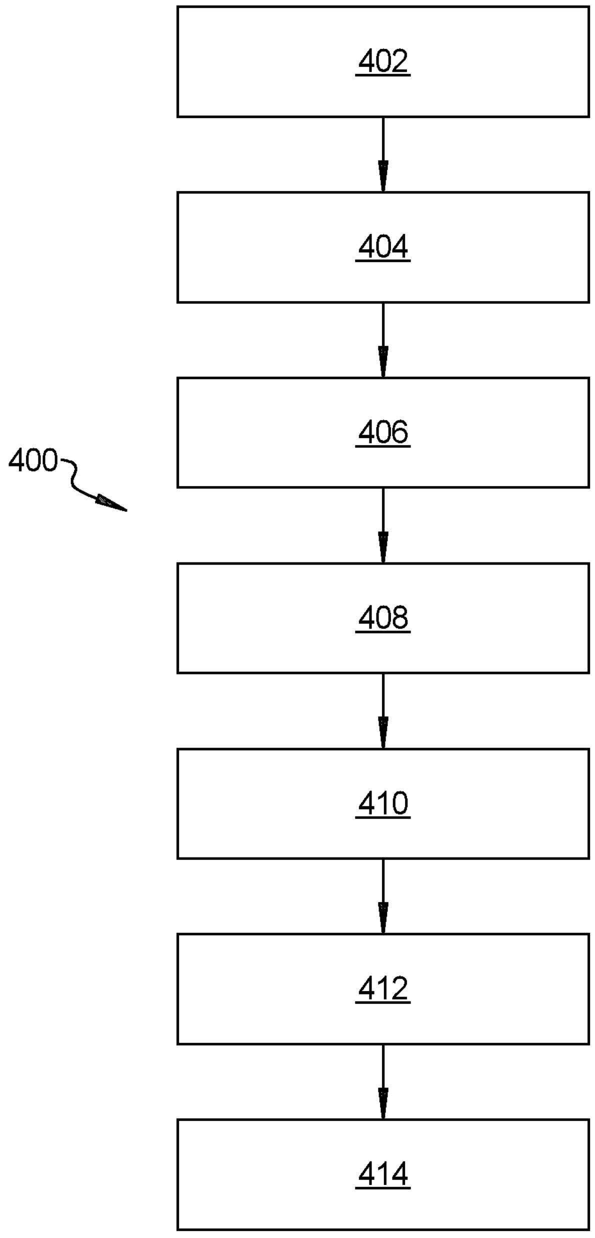
FIG. 12 shows a flowchart of the method performed at the road safety analyzer of FIG. 5.

FIG. 12 shows a flowchart 400 of the method performed at the road safety analyzer 318 of FIG. 5. At block 402, telemetric data from the plurality of vehicles traveling within the plurality of normalized road segments is accumulated and grouped as a trace representative of the traffic stream. The trace is published at a publication or subscription server 314. In general, the trace is published to the road safety analyzer 318. In box 402, a statistical analysis or evaluation of the measurements X from the trace(s) are transformed into road metrics M. At block 404, the metrics M are used to determine one or more properties of each of the normalized road segments (i.e., mean and standard deviation). At block 406 the properties are used to generate a profile F for each of the plurality of normalized road segments. In box 408, the properties or property values are scaled or scored to determine their departure from an expected profile for each normalized road segment within the traffic stream. The properties are used to determine a road performance value for each of the plurality of road segments and time period. In one embodiment, the properties can be weighted using model coefficients for the road profile of the road segment. Each property value is multiplied by its corresponding weight and the products are summed to obtain the road performance value, as shown in Eq. (5):

$$S=\sum_{i=1}^{m}\omega_i\times p_i \quad \text{Eq. (5)}$$

In block 408, the road performance value is used to determine a disruption score that describes a likelihood of an adverse driver experience along each of the plurality of road segments for the time period.

Moving to block 410, for each of the plurality of road segments, the method 400 includes determining, with the remote server 206, if traffic flow within each of the plurality of road segments, at specific points in time, is congested. Moving to block 412, the method 400 further includes identifying, with the remote server, a congested traffic stream 80, 180, wherein the congested traffic stream includes a plurality of contiguous normalized road segments that have congested traffic flow. In an exemplary embodiment, this includes mapping congested cells 58 within a two-dimensional spatial-temporal grid 57 of cells 58, wherein each cell 58 represents a normalized road segment at a specified time.

In an exemplary embodiment, the for each of the plurality of normalized road segments, determining if the traffic flow is congested at block 410 further includes, for each cell within the two-dimensional spatial-temporal grid 57, 157 of cells 58, calculating a congestion metric based on at least one vehicle performance metric, comparing the calculated congestion metric to a pre-determined threshold, and identifying congestion within the cell when the calculated congestion metric exceeds the pre-determined threshold. For example, the congestion metric may be based on slow traffic, wherein for each cell within the two-dimensional spatial-temporal grid 57, 157 the method includes calculating, with the remote server 206, a spatial temporal slow traffic proportion, comparing the calculated spatial temporal slow traffic proportion to a pre-determined threshold, and identifying congestion within the cell 58 when the calculated spatial temporal slow traffic proportion exceeds the pre-determined threshold.

In an exemplary embodiment, the identifying a congested traffic stream at block 412 further includes classifying a level of congestion within each cell based on the calculated spatial temporal slow traffic proportion.

Moving to block 414, the method 400 further includes quantifying the congested traffic stream 80, 180 by identifying a region 74, span 76 and duration 78 of the congested traffic stream 80, 180. In an exemplary embodiment, the remote server 206 quantifies the congested traffic stream 80, 180 by mapping at least one vehicle behavior metric within the region 74 of the congested traffic stream 80, 180 within the two-dimensional spatial-temporal grid 57, 157 of cells 58.

Figure 13:
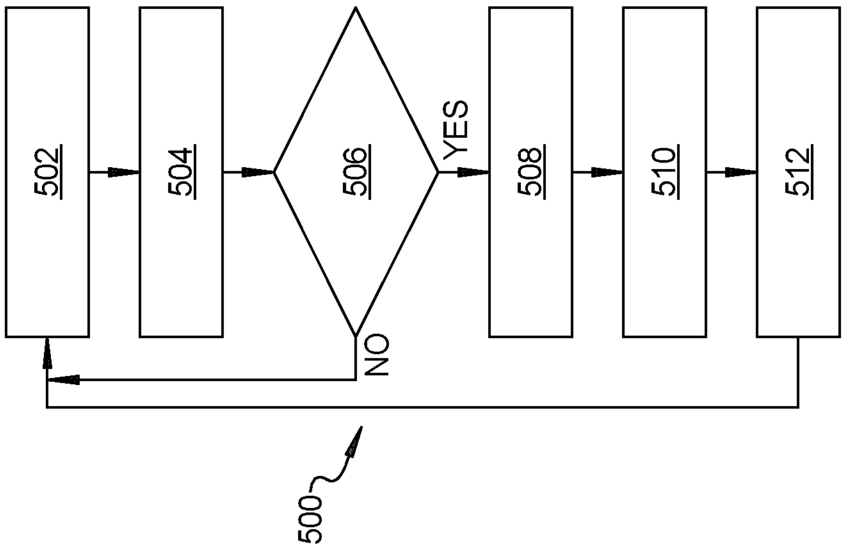
FIG. 13 shows a flowchart of a method for processing telemetric data to determine road properties.

FIG. 13 shows a flowchart 500 of a method for processing telemetric data to determine road properties for a road segment. In box 502, the telemetric data is acquired. In box 504, the telemetric data is matched to a map. In box 506, a decision is made whether the vehicle is still in the road segment. If the vehicle has not left the road segment, the method returns to box 502 to acquire more telemetric data from the vehicle, thereby accumulating the telemetric data for the road segment. If the vehicle has left the road segment, the method then proceeds to box 508. In box 508, the accumulation of the telemetric data is completed and the data is stored in a trace that is published to the road metrics analyzer. In box 510, properties of the road segment (such as headway dynamics variables) are computed from the trace data. In box 512, the properties are stored in the road metrics database 320 to update the data stored therein.

Figure 14:
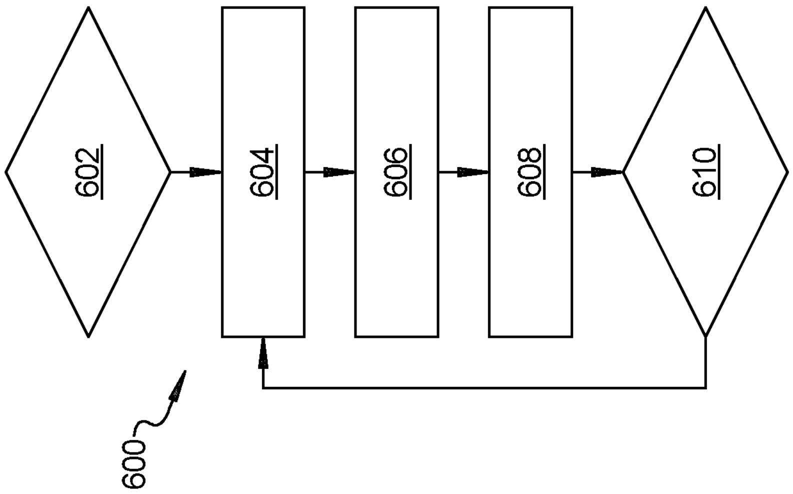
FIG. 14 shows a flowchart of a short-term maintenance routine performed on the historical data stored in the road metrics database.

FIG. 14 shows a flowchart 600 of a short-term maintenance routine performed on the historical data stored in the road metrics database 320. In box 602, a time is referred to in order to determine whether the data is older than a selected short time period, such as 15 minutes. If the time period has not expired, then the method proceeds to box 604. In box 604, road segment data is obtained for this time period. In box 606, the historical database is updated with the properties determined from the road segment data. In box 608, any metrics that are expired (i.e., older than the 15 minutes time period) are purged form the historical database. In box 610, a determination is made whether more data is being captured from additional road segments. If yes, then the method returns to box 604, where the additional road segment data is obtained. Otherwise, the method stops.

Figure 15:
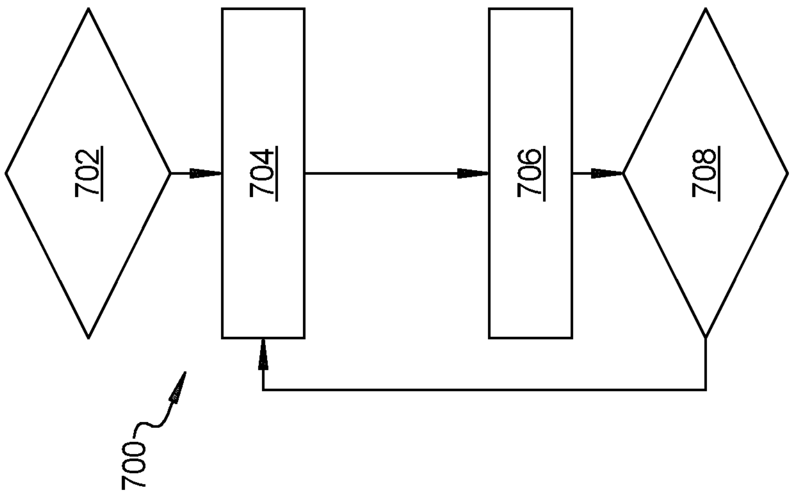
FIG. 15 shows a flowchart of a long-term maintenance routine performed on the historical data in the road metrics database.

FIG. 15 shows a flowchart 700 of a long-term maintenance routine performed on the historical data in the road metrics database 320. In box 702, a time is referred to in order to determine whether the data is older than a selected long time period, such as one month. In box 704, road segment data is obtained for the month-long time period. In box 706, any metrics that are expired (i.e., older than the one-month time period) are purged form the historical database. In box 708, a determination is made whether more data is being captured from additional road segments. If yes, then the method returns to box 704, where the additional road segment data is obtained. Otherwise, the method stops.

Figure 16:
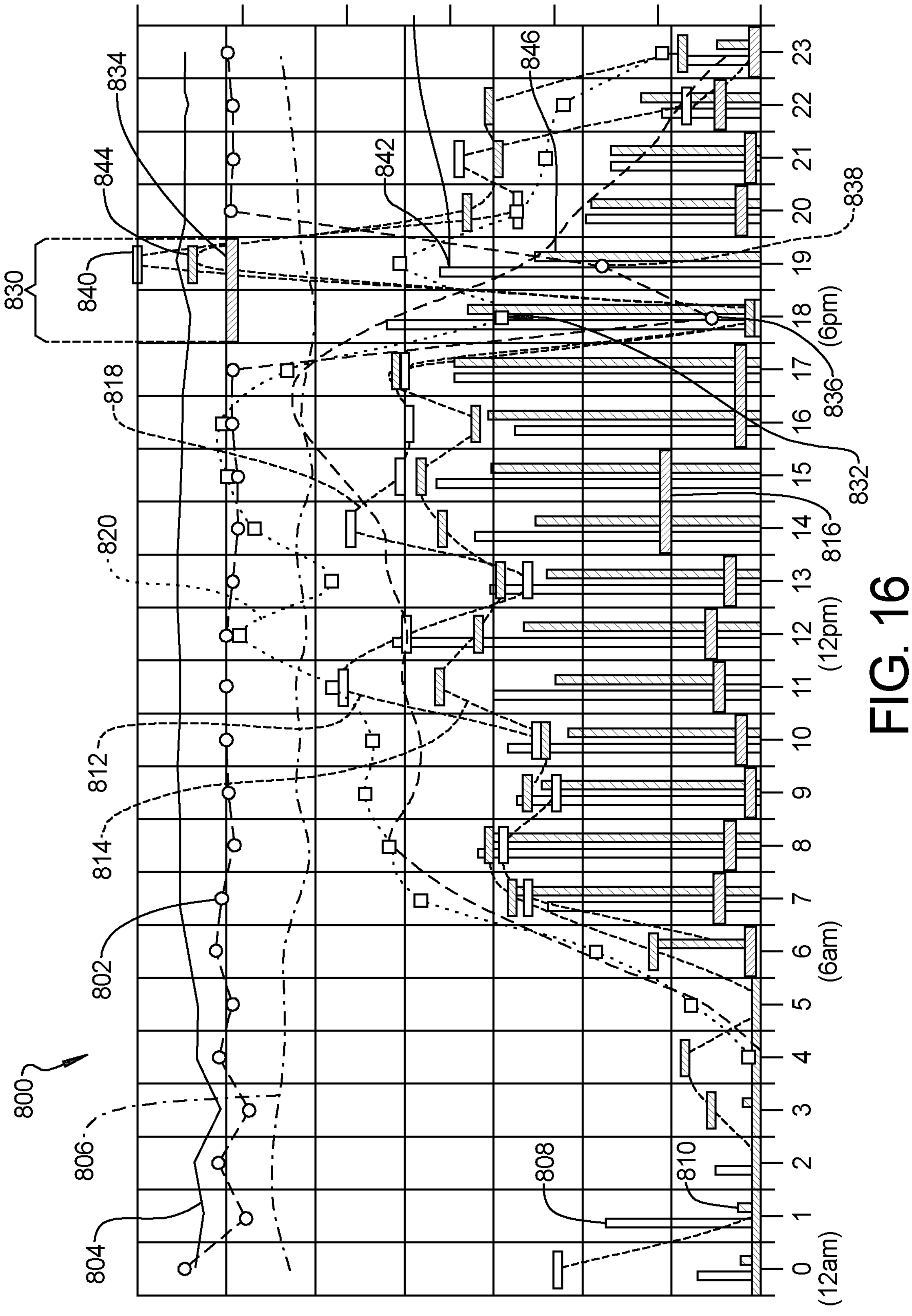
FIG. 16 shows a time chart for a selected road segment.

FIG. 16 shows a time chart 800 for a selected road segment, such as road segment of a freeway. The time chart 800 illustrates various properties calculated over a 24-hour time period for the selected segment and compares selected properties against an expected profile. Time is shown along the x-axis and is partitioned into 24 one-hour time segments. Properties are shown for each time segment. The traffic pattern represented in the time chart 800 shows a low amount of traffic during early morning hours (bin 0 to bin 5, about 12 midnight to 6:00 a.m.), During this time, there is a low amount of traffic and traffic tends to flow unimpeded. A morning traffic rush is shown in bin 6 through bin 9 (about 6:00 a.m. to 10:00 a.m.). A midday business traffic is shown in bins 10 through 14 (about 10:00 a.m. to: 3:00 p.m.). An afternoon rush traffic is shown from bin 15 to bin 18 (about 3:00 p.m. to 7:00 p.m.). Night-time traffic is shown from bin 19 to bin 23 (about 7:00 p.m. to 12 midnight).

Average velocity curve 802 shows an average velocity (v) for vehicles on the road segment over the 24-hour time period. First deviation curve 804 shows a first standard deviation of the average velocity and second deviation curve 806 shows a second standard deviation of the average velocity. Only the upper limit of the first deviation of the average velocity is shown for illustrative purposes. Similarly, only the lower limit of the second deviation of the average velocity is shown for illustrative purposes.

A velocity entropy profile 808 is shown for each of the one-hour time periods. Also, an acceleration entropy profile 810 is shown for each of the one-hour time periods. The velocity entropy profile 808 and the acceleration entropy profile 810 are both represented within a one-hour time period as a bar extending vertically, with the height of the bar indicating a value of the entropy. The velocity entropy profile 808 and the acceleration entropy profile 810 for a selected time segment can be determined from historical data obtained during the selected time segment for a selected time period, such as a week, a month, etc. Also shown is the actual velocity entropy 812 and the actual acceleration entropy 814, which are obtained from current telemetric data.

The number of hard braking events 816 within a one-hour period is represented by a bar. Expected vehicle density curve 818 shows an expected vehicle density on the road segment during a time period. Actual vehicle density curve 820 shows an actual vehicle density on the road segment during the particular 24-hour period of the time chart.

During the early morning hours (about 12 midnight to 6:00 a.m.), the traffic exhibits an expected vehicle movement. The average velocity curve 802 is relatively constant and generally represents a free flow traffic pattern. The number of vehicles (actual vehicle density curve 820) on the road segment is relatively low, as expected. The actual velocity entropy 812 and the actual acceleration entropy 814 are close to the velocity entropy profile 808 and the acceleration entropy profile 810, respectively.

During the morning rush hour (about 6:00 a.m. to 10:00 a.m.), the number of vehicles (actual vehicle density curve 820) increases, as expected. The actual velocity entropy 812 and the actual acceleration entropy 814 remain close to the velocity entropy profile 808 and the acceleration entropy profile 810, respectively. The average velocity curve 802 during thus morning rush hour still exhibits a free flow of traffic.

During the midday business hours (about 10:00 a.m. to 3:00 p.m.), the actual vehicle density curve 820 can be seen to increase over the vehicle density of the morning rush hour. The average velocity still exhibits a free flow of traffic. The actual velocity entropy is highly elevated over the velocity entropy profile for various one-hour time periods (i.e., at least in bins 11 and 14). Similarly, the actual acceleration entropy 814 is highly elevated over the acceleration entropy profile 810 for these same one-hour time periods.

During the afternoon business hours (about 3:00 p.m. to 7:00 p.m.) a wreck occurs at about 6:19 p.m. The after-effects of the wreck are shown in the time period 830. As a result of the wreck, the vehicles are slowed down (local velocity minimum 836) and a recorded 51 hard braking events are recorded (bar 834). In the time graph, the actual vehicle density curve 820 drops in bin 18 (as indicated by local vehicle density minimum 832). The actual velocity entropy 812 is reduced in bin 18 (5:00 p.m. to 6:00 p.m.) to relatively low values (in comparison to the velocity entropy profile 808 in bin 18). Similarly, the actual acceleration entropy 814 is reduced in bin 18 to relatively low values (in comparison to the acceleration entropy profile 810). As shown by local velocity minimum 836, the velocity has dropped to very low values and is considerably outside of the range set by the second deviation curve 806 for the average velocity curve 802.

During the night-time traffic hours (about 7:00 p.m. to 12 midnight), the traffic has recovered from the vehicle wreck. The local velocity entropy 840 for bin 19 exceeds the local velocity entropy profile 842 for bin 19. Additionally, the local acceleration entropy 844 for bin 19 exceeds the local acceleration entropy profile 846 for bin 19. As shown by velocity point 838, the average velocity for bin 19 is greater than in the one-hour time period of bin 18 (local velocity minimum 836). However, the average velocity for bin 19 remains low and is still outside the range set by the second standard deviation for the average velocity. In addition, the actual vehicle density has increased in bin 19 from the local vehicle density minimum 832 in of bin 18.

FIG. 17 shows a table 900 having various properties and related scaled or scored values. The properties are tabulated for a plurality of road segments recorded over a selected time of day for two consecutive days. Road segments are labelled 1 through 7. The first day (Sep. 18, 2019) is shown in the first 7 rows and the second day (Sep. 19, 2019) is shown in the second 7 rows. As shown for the first day, the road segments 4 and 5 (circle 906) both have a decrease in velocity in comparison to road segments 1-3 and 6-7 (circle 908). A disruption score for road segment 4 is 96 and for road segment 5 is 90 (circle 910).

As shown for the second day (Sep. 19, 2019), an accident occurs on road segment 4. Velocity decreases over road segments 4 and 5 (circle 912) compared to road segments 1-3 and 6-7. The disruption score for road segment 4 is at 100 (circle 914), indicating the occurrence of an instability, disruption or disruptive event over road segment 4. The disruption score for the second day can be used by the vehicle to select an action, such as changing lanes or changing a route away from the road segment 4.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A method of identifying and quantifying congestion within a traffic stream, comprising;

obtaining, by a server, over time, telemetric data from a plurality of vehicles traveling within a plurality of normalized road segments of equal length;

determining, by the server, at least one property of each normalized road segment based on the telemetric data and a road profile for each of the plurality of normalized road segments;

determining, by the server, a disruption score indicative of a level of disruption in a traffic flow within each of the plurality of normalized road segments based on the at least one property, including:

travel speed uncertainty, which is obtained as an entropy value of a velocity distribution; and pedal usage uncertainty, which is obtained as an entropy value of a velocity change distribution;

for each of the plurality of normalized road segments, determining, by the server, if the traffic flow is congested;

identifying, by the server, a congested traffic stream, wherein the congested traffic stream includes a plurality of contiguous normalized road segments that have congested traffic flow;

providing, by the server, an output signal including information related to traffic congestion within the traffic stream;

receiving, by a trajectory planning system within an autonomous vehicle, the output signal; and automatically, with a navigation module of the autonomous vehicle, performing a navigational operation based on the output signal, wherein performing a navigational operation includes automatically, with the navigation module:

autonomously performing a navigational operation including at least one of selecting an alternate route for the vehicle, changing a lane in which the vehicle is moving, changing a headway dynamic for the vehicle, changing a speed of the vehicle, and changing a speed profile of the vehicle; and when the autonomous vehicle is being driven manually, displaying instructions for a driver of the autonomous vehicle.

2. The method of claim 1, wherein the identifying a congested traffic stream, wherein the congested traffic stream includes a plurality of contiguous normalized road segments that have congested traffic flow further includes mapping congested cells within a two-dimensional spatial-temporal grid of cells, wherein each cell represents a normalized road segment at a specified time.

3. The method of claim 2, wherein the determining if the traffic flow is congested further includes, for each cell within the two-dimensional spatial-temporal grid of cells:
- calculating a congestion metric based on at least one vehicle performance metric;
- comparing the calculated congestion metric to a predetermined threshold; and
- identifying congestion within the cell when the calculated congestion metric exceeds the pre-determined threshold.

4. The method of claim 2, wherein the determining if the traffic flow is congested further includes, for each cell within the two-dimensional spatial-temporal grid of cells:
- calculating a spatial temporal slow traffic proportion;
- comparing the calculated spatial temporal slow traffic proportion to a pre-determined threshold; and
- identifying congestion within the cell when the calculated spatial temporal slow traffic proportion exceeds the pre-determined threshold.

5. The method of claim 4, wherein the identifying a congested traffic stream, wherein the congested traffic stream includes a plurality of contiguous road segments that have congested traffic flow further includes classifying a level of congestion within each cell based on the calculated spatial temporal slow traffic proportion.

6. The method of claim 5, further including quantifying the congested traffic stream by identifying a region, span and duration of the congested traffic stream.

7. The method of claim 6, further including quantifying the congested traffic stream by mapping at least one vehicle behavior metric within the region of the congested traffic stream within the two-dimensional spatial-temporal grid of cells.

8. The method of claim 1, further comprising outputting the notification signal to at least one of a display on a traffic monitoring device for analysis of the traffic flow, a sign to be displayed to the traffic flow, and the plurality vehicles for navigating the vehicle with respect to the traffic flow.

9. The method of claim 8, wherein navigating the vehicle further includes at least one of selecting an alternate route for the vehicle, changing a lane in which the vehicle is moving, changing a headway for the vehicle, changing a speed of the vehicle, and changing a speed profile of the vehicle.

10. The method of claim 1, further comprising accumulating the telemetric data from the plurality of vehicles at regular intervals, storing the accumulated telemetric data to a trace for the plurality of vehicles and determining the property of each of the plurality of road segments from the trace.

11. The method of claim 1, wherein the road profile represents an expected flow of traffic over the road segment in an absence of a disruptive event.

12. The method of claim 1, wherein the server is a remote cloud-based server, wherein, the obtaining, with the server, over time, telemetric data from a plurality of vehicles traveling within a plurality of normalized road segments further includes receiving, with the server, transmitted telemetric data from the plurality of vehicles wirelessly.

13. The method of claim 1, further comprising storing the properties in a road metrics database and purging the properties from the road metrics database after a selected time period has expired.

14. A system for identifying and quantifying congestion within a traffic stream, comprising;

a server adapted to:
- obtain, over time, telemetric data from a plurality of vehicles traveling within a plurality of normalized road segments of equal length;
- determine at least one property of each normalized road segment based on the telemetric data and a road profile representing an expected flow of traffic over the road segment in an absence of a disruptive event for each of the plurality of normalized road segments;
- determine a disruption score indicative of a level of disruption in a traffic flow within each of the plurality of normalized road segments based on the at least one property, including:
  - travel speed uncertainty, which is obtained as an entropy value of a velocity distribution; and
  - pedal usage uncertainty, which is obtained as an entropy value of a velocity change distribution;
- map the plurality of normalized road segments within a two-dimensional spatial-temporal grid of cells, wherein each cell represents a normalized road segment at a specified time;
- for each of the plurality of cells, determine if the traffic flow is congested by calculating a congestion metric based on at least one vehicle performance metric, comparing the calculated congestion metric to a predetermined threshold, identifying congestion within the cell when the calculated congestion metric exceeds the pre-determined threshold, and classifying a level of congestion within each cell based on the calculated congestion metric;
- identify a congested traffic stream, wherein the congested traffic stream includes a plurality of contiguous cells that have congested traffic flow;
- provide an output signal including information related to traffic congestion within the traffic stream;
- receive, by a trajectory planning system within an autonomous vehicle, the output signal; and
- automatically, with a navigation module of the autonomous vehicle, perform a navigational operation based on the output signal, wherein the navigational operation includes:
  - at least one of autonomously selecting an alternate route for the vehicle, changing a lane in which the vehicle is moving, changing a headway dynamic for the vehicle, changing a speed of the vehicle, and changing a speed profile of the vehicle; and
  - when the autonomous vehicle is being driven manually, displaying instructions for a driver of the autonomous vehicle.

15. The system of claim 14, wherein the server is further adapted to quantify the congested traffic stream by identifying a region, span and duration of the congested traffic stream, and to map at least one vehicle behavior metric within the region of the congested traffic stream within the two-dimensional spatial-temporal grid of cells.

16. The system of claim 15, wherein the server is further adapted to provide an output signal to at least one of a display on a traffic monitoring device for analysis of the traffic flow; a sign to be displayed to the traffic flow; and at least one of the plurality of vehicles for navigating the plurality of vehicles with respect to the traffic flow.

17. The system of claim 16, wherein navigating the plurality of vehicles further comprises at least one of selecting an alternate route for the vehicle; changing a lane in which the vehicle is moving; changing a headway dynamic for the vehicle; changing a speed of the vehicle; and changing a speed profile of the vehicle.

18. The system of claim 17, wherein the server is further adapted to accumulate the telemetric data from the plurality of vehicles at regular intervals, store the accumulated telemetric data to a trace for the plurality of vehicles and determine the property of each of the plurality of road segments from the trace.

19. The system of claim 18, wherein the server is further adapted to store the properties in a road metrics database and purge the properties from the road metrics database after a selected time period has expired.

20. A method of identifying and quantifying congestion within a traffic stream, comprising;

obtaining, by a server, over time, telemetric data from a plurality of vehicles traveling within a plurality of normalized road segments of equal length;

determining, by the server, at least one property of each normalized road segment based on the telemetric data and a road profile for each of the plurality of normalized road segments;

determining, by the server, a disruption score indicative of a level of disruption in a traffic flow within each of the plurality of normalized road segments based on the at least one property, including:

travel speed uncertainty, which is obtained as an entropy value of a velocity distribution; and pedal usage uncertainty, which is obtained as an entropy value of a velocity change distribution;

mapping the plurality of normalized road segments within a two-dimensional spatial-temporal grid of cells, wherein each cell represents a normalized road segment at a specified time;

for each cell of the two-dimensional spatial-temporal grid of cells, determining, by the server, if the traffic flow is congested by calculating a congestion metric based on at least one vehicle performance metric, comparing the calculated congestion metric to a pre-determined threshold, identifying congestion within the cell when the calculated congestion metric exceeds the pre-determined threshold, and classifying a level of congestion within each cell based on the calculated congestion metric;

identifying, by the server, a congested traffic stream, wherein the congested traffic stream includes a plurality of contiguous cells that have congested traffic flow;

quantifying, by the server, the congested traffic stream by identifying a region, span and duration of the congested traffic stream, and mapping at least one vehicle behavior metric within the region of the congested traffic stream within the two-dimensional spatial-temporal grid of cells;

providing, by the server, an output signal including information related to traffic congestion within the traffic stream to at least one of a display on a traffic monitoring device for analysis of the traffic flow, a sign to be displayed to the traffic flow, and, the plurality of vehicles for navigating the vehicle with respect to the traffic flow, wherein navigating the vehicle further comprises at least one of autonomously selecting an alternate route for the vehicle, changing a lane in which the vehicle is moving, changing a headway dynamic for the vehicle, changing a speed of the vehicle, and changing a speed profile of the vehicle.

* * * * *